United States Patent
Hoblit

(10) Patent No.: US 7,251,647 B2
(45) Date of Patent: Jul. 31, 2007

(54) WEB BASED RESOURCE DISTRIBUTION SYSTEM

(75) Inventor: Robert S. Hoblit, Knightdale, NC (US)

(73) Assignee: International Business Machines Corporation, Armonk, NY (US)

( * ) Notice: Subject to any disclaimer, the term of this patent is extended or adjusted under 35 U.S.C. 154(b) by 1164 days.

(21) Appl. No.: 09/799,862

(22) Filed: Mar. 5, 2001

(65) Prior Publication Data
US 2002/0124009 A1 Sep. 5, 2002

(51) Int. Cl.
G06F 17/30 (2006.01)
(52) U.S. Cl. .................. 707/3; 705/26; 705/51
(58) Field of Classification Search .............. 707/1–10; 705/51, 26
See application file for complete search history.

(56) References Cited

U.S. PATENT DOCUMENTS

| | | | | | |
|---|---|---|---|---|---|
| 4,153,931 | A | * | 5/1979 | Green et al. ............. | 707/104.1 |
| 5,288,980 | A | * | 2/1994 | Patel et al. ................. | 235/381 |
| 5,427,640 | A | * | 6/1995 | Daniels ...................... | 156/250 |
| 5,721,906 | A | | 2/1998 | Siefert ........................ | 395/609 |
| 5,832,499 | A | * | 11/1998 | Gustman ................ | 707/103 R |
| 5,889,990 | A | * | 3/1999 | Coleman et al. ........... | 709/322 |
| 5,907,845 | A | | 5/1999 | Cox et al. ................... | 707/102 |
| 5,991,791 | A | | 11/1999 | Siefert ........................ | 709/100 |
| 6,026,403 | A | * | 2/2000 | Siefert ........................ | 707/10 |
| 6,058,417 | A | | 5/2000 | Hess et al. .................. | 709/219 |
| 6,260,040 | B1 | * | 7/2001 | Kauffman et al. ............ | 707/10 |
| 6,289,460 | B1 | * | 9/2001 | Hajmiragha ................ | 713/200 |
| 6,332,124 | B1 | * | 12/2001 | Loeb et al. ..................... | 705/1 |
| 6,493,702 | B1 | * | 12/2002 | Adar et al. ..................... | 707/3 |
| 6,901,386 | B1 | * | 5/2005 | Dedrick et al. ............... | 705/59 |
| 2001/0018742 | A1 | * | 8/2001 | Hirai .......................... | 713/193 |
| 2002/0002541 | A1 | * | 1/2002 | Williams ..................... | 705/51 |
| 2002/0107838 | A1 | * | 8/2002 | Tsai .............................. | 707/3 |

OTHER PUBLICATIONS

Michael Edwards et al., www.mediachest.com, Jul. 2002.*
Mitchell et al. "OCLC Inter-library lending and document delivery services", Dec. 6, 1994. pp. 3-8.*

* cited by examiner

Primary Examiner—Don Wong
Assistant Examiner—Hanh Thai
(74) Attorney, Agent, or Firm—Robert A. Voight, Jr.; Winstead PC

(57) ABSTRACT

A system and method for distributing a collection of physical (tangible) resources, e.g., books, newspapers, periodicals, trade publications, compact discs, equipment, video tapes microfilm. In one embodiment, a method comprises the step of accessing a web server maintaining a database of profiles associated with the collection of resources by a user via a web browser. The user may then issue a search request via the web browser to search for one or more resources within the collection of resources. Upon identifying one or more resources from the search, the user may contact one or more owners of the one or more resources identified. The user may contact the one or more owners based on the contact information provided in the profiles in the one or more resources identified. Upon contacting the one or more owners, the user may borrow the one or more resources previously identified.

6 Claims, 5 Drawing Sheets

| |
|---|
| Resource Name |
| Resource Subject |
| Resource Type |
| Resource Owner |
| Resource Location |
| Check In/Out Status |
| Checkout Restrictions |
| Checkout Currently Allowed |
| Checkout Statistics |
| Permitted Length of Checkout |
| Author(s) |
| Black-out Period |
| New Owner Need Indicator |
| Contact Information |

FIG. 4

WEB BASED RESOURCE DISTRIBUTION SYSTEM

TECHNICAL FIELD

The present invention relates to the field of information systems, and more particularly to a web based resource distribution system configured to provide users with the ability to borrow resources from the owners of resources.

BACKGROUND INFORMATION

As a result of the proliferation of computer systems including LANs (local area networks) and the Internet, individuals as well as organizations transfer, store and utilize many on-line electronic documents. The past several years have seen a dramatic growth towards the use of the Internet/Intranet as a medium for publishing electronic documents.

Computer users may now be able to search for particular types of materials, e.g., books, periodicals, trade publications, newspapers, over the Internet/Intranet such as in a "virtual library." A virtual library may allow users access to certain types of materials over the Internet/Intranet which an ordinary library makes available to the public. Typically, the computer user may be able to download a copy of the material, e.g., newspaper article, over the Internet/Intranet in the form of downloadable data.

Unfortunately, computer users may not be able to access all types of materials in a virtual library environment. For example, computer users may not be able to borrow materials, especially those in a physical form, e.g., compact discs, equipment, video tapes, microfilm.

It would therefore be desirable to develop a web based resource distribution system, e.g., virtual library system, that allows users to borrow materials in physical form. It would further be desirable to develop a web based resource distribution system, e.g., virtual library system, that maintains a listing of resources that are available for distribution across a company's facility at a single location or campus.

SUMMARY

The problems outlined above may at least in part be solved in some embodiments by a web based resource distribution system that maintains a database of profiles on a collection of resources, e.g., books, newspapers, periodicals, trade publications, compact discs, equipment, video tapes, microfilm. Each resource may have a profile associated with it. Each profile may comprise fields of information including a field storing contact information for the owner of a particular resource. Once a user of the web based resource distribution system has located a resource of interest by searching for resources in the collection of resources whose profiles are stored in the database, the user may directly contact the owner of the resource of interest using the contact information in the profile to borrow the resource from the owner. By borrow, it is meant that the resource will be physically received by the user with the implied or express intention of returning the resource to the owner, typically after an agreed upon period of time.

In one embodiment, a method for distributing a collection of resources comprises the step of accessing a web server maintaining a database of profiles associated with the collection of resources by a user via a web browser. The user may then issue a search request via the web browser to search for one or more resources within the collection of resources. The search may be conducted based on one or more fields of information in the profiles associated with the collection of resources. Upon identifying one or more resources from the search, the user may contact one or more owners of the one or more resources identified. The user may contact the one or more owners based on the contact information provided in the profiles in the one or more resources identified. Upon contacting the one or more owners, the user may borrow the one or more resources previously identified.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which:

FIG. 4 illustrates an embodiment of the present invention of a resource profile comprising one or more fields of information.

DETAILED DESCRIPTION

The present invention comprises a system and method for distributing a collection of physical (tangible) resources, e.g., books, newspapers, periodicals, trade publications, compact discs, equipment, video tapes, microfilm. In one embodiment of the present invention, a method comprises the step of accessing a web server maintaining a database of profiles associated with the collection of resources by a user via a web browser. The user may then issue a search request via the web browser to search for one or more resources within the collection of resources. The search may be conducted based on one or more fields of information in the profiles associated with the collection of resources. Upon identifying one or more resources from the search, the user may contact one or more owners of the one or more resources identified. The user may contact the one or more owners based on the contact information provided in the profiles in the one or more resources identified. Upon contacting the one or more owners, the user may borrow the one or more resources previously identified.

Figure 1:
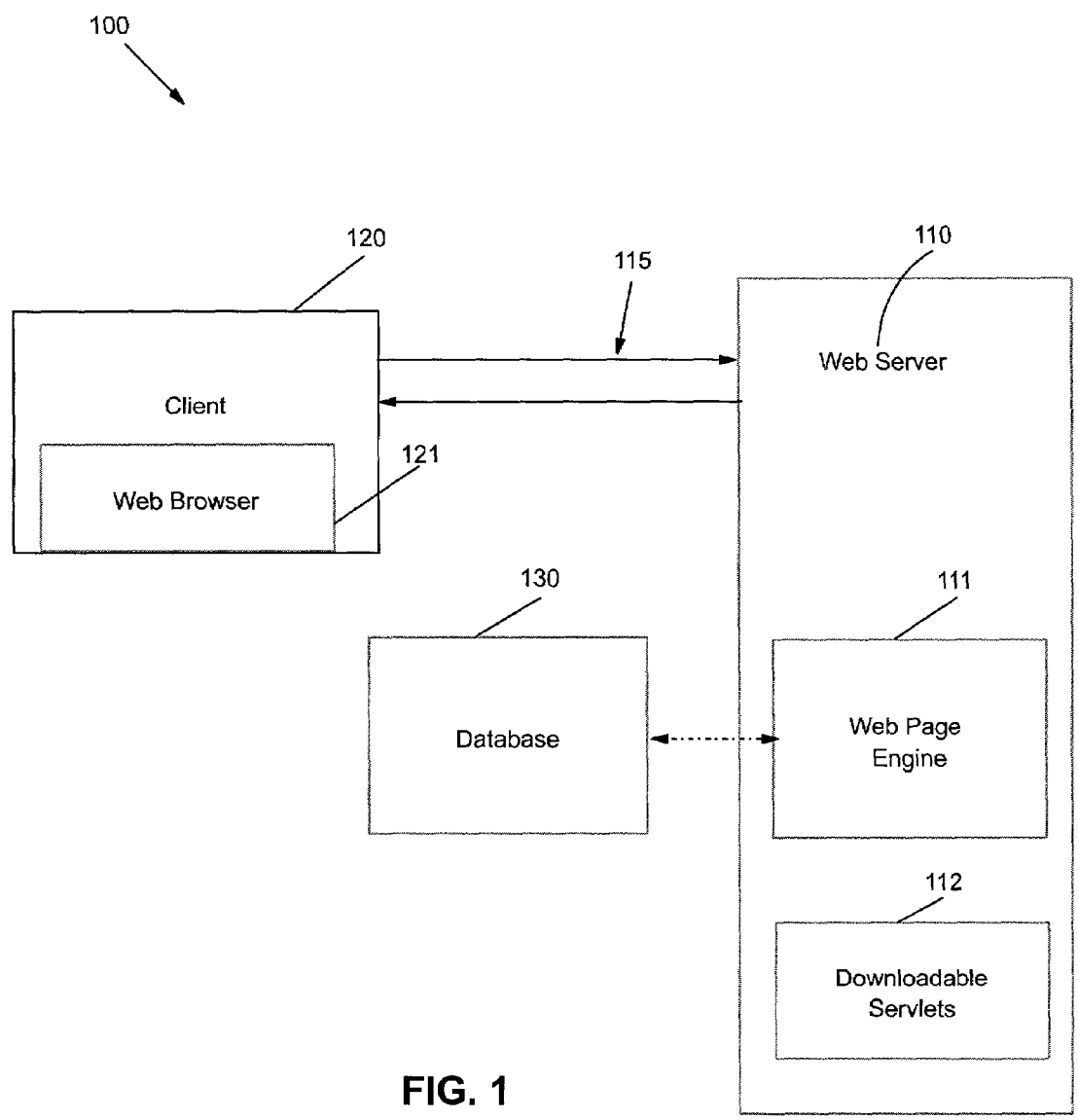
FIG. 1 illustrates a web based resource distribution system configured in accordance with the present invention.

FIG. 1—Web Based Resource Distribution System

FIG. 1 illustrates an embodiment of the present invention of a web based resource distribution system 100. Resource distribution system 100 comprises a web server 110 connected to a client 120. Client 120 and web server 110 may be coupled for bidirectional communication via a network path, generally indicated by 115, which in practice may be implemented by one or more wireless or wired network links having associated bandwidths or data rates. In one embodiment, client 120 may be connected to web server 110 through the Internet. The Internet may refer to a network of computers. In one embodiment, client 120 may be connected to web server 110 through an Intranet. Intranets are internal information networks which are based on Internet standards and protocols. In other embodiments, network path 115 may be any global open network or even a local or wide area network within an organization. It is noted that resource distribution system 100 may comprise a plurality of clients 120 connected to web server 110 and that FIG. 1 is illustrative.

Client 120 comprises a web browser 121 which may be configured for communicating with the Intranet or Internet and for reading and executing servlets. A servlet may be a program typically written in the Java object-oriented programming language. A servlet may be created in a way that allows it to be easily added to the code already running on web server 110 and may therefore extend the functionality provided by web server 110. A servlet typically implements code to perform a particular task, e.g., retrieving information from a particular type of database.

Web server 110 may comprise a web page engine 111 for maintaining and providing access to an Intranet or Internet web page which is enabled to forward servlets 112 to web browser 121 of client 120. A user may select a particular service which corresponds to one of the servlets 112, thereby causing web browser 121 of client 120 to initiate execution of the corresponding servlet 112.

Web page engine 111 may further be configured to maintain a database 130 storing profiles on a collection of resources, e.g., compact discs, equipment, newspapers, video tapes, microfilm, books, periodicals, trade publications, available for distribution. Profiles, as will be explained in greater detail in the discussion of FIG. 3, comprise fields of information regarding a resource associated with that profile. It is noted that in one embodiment, database 130 may be located within web server 110.

Figure 2:
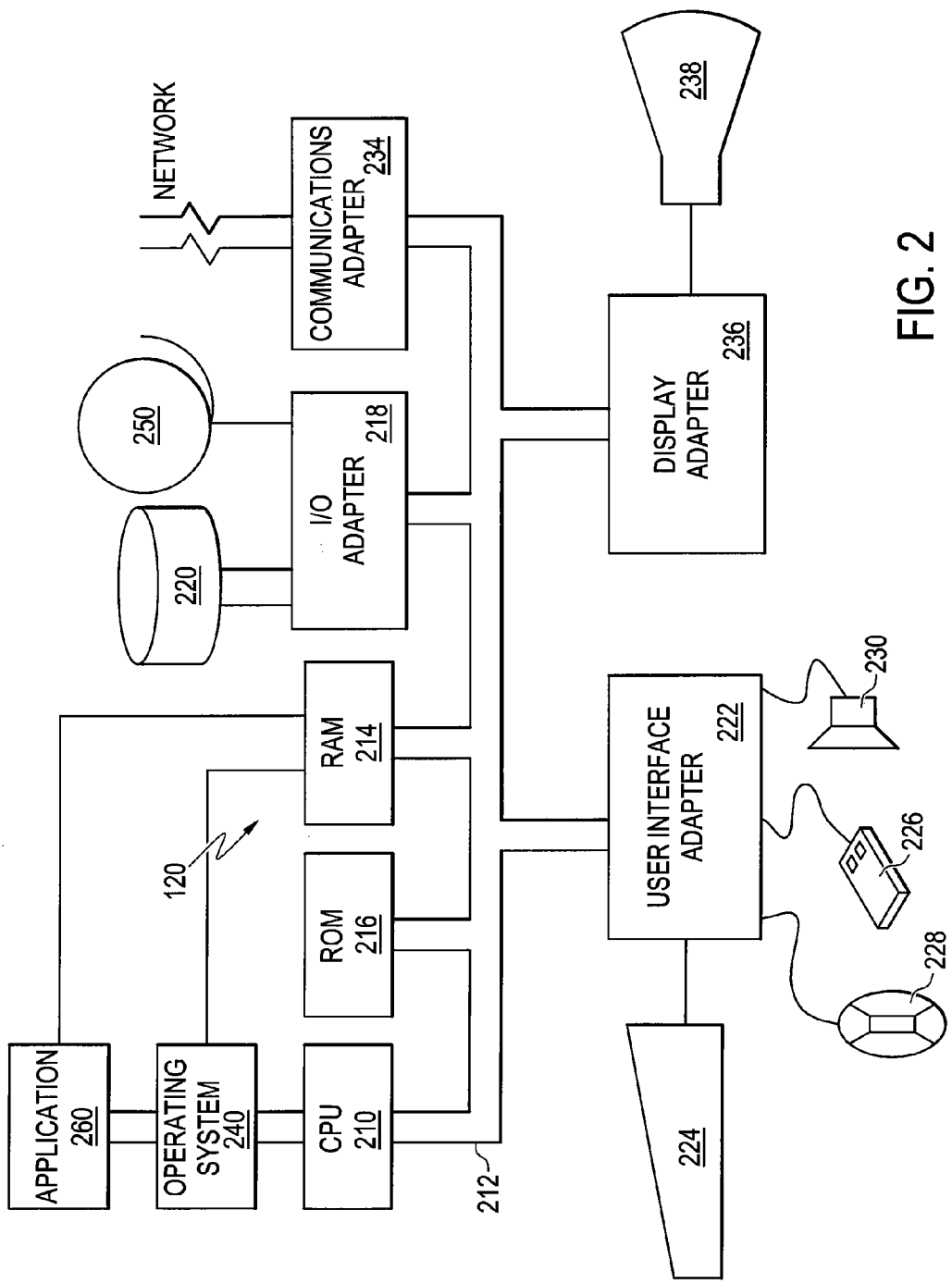
FIG. 2 illustrates an embodiment of the present invention of a client in a web based resource distribution system.

FIG. 2—Hardware Configuration of Client

FIG. 2 illustrates a typical hardware configuration of client 120 which is representative of a hardware environment for practicing the present invention. Client 120 has a central processing unit (CPU) 210, such as a conventional microprocessor, coupled to various other components by system bus 212. An operating system 240, e.g., DOS, OS/2™, Windows™, Linux™, runs on CPU 210 and provides control and coordinates the function of the various components of FIG. 2. Application 260, e.g., web browser 121, runs in conjunction with operating system 240 and provides output calls to operating system 240 which implements the various functions to be performed by the application 260. Read only memory (ROM) 216 is coupled to system bus 212 and includes a basic input/output system ("BIOS") that controls certain basic functions of client 120. Random access memory (RAM) 214, I/O adapter 218, and communications adapter 234 are also coupled to system bus 212. It should be noted that software components including operating system 240 and application 260 are loaded into RAM 214 which is the computer system's main memory. I/O adapter 218 may be a small computer system interface ("SCSI") adapter that communicates with disk units 220, e.g., disk drive, and tape drives 250. Communications adapter 234 interconnects bus 212 with the Intranet or Internet enabling client 120 to communicate with web server 110. Input/Output devices are also connected to system bus 212 via a user interface adapter 222 and a display adapter 236. Keyboard 224, trackball 228, mouse 226 and speaker 230 are all interconnected to bus 212 through user interface adapter 222. Event data may be input to client 120 through any of these devices. A display monitor 238 is connected to system bus 212 by display adapter 236. In this manner, a user is capable of inputting to client 120 through keyboard 224, trackball 228 or mouse 226 and receiving output from client 120 via display 238 or speaker 230.

Preferred implementations of the invention include implementations as a computer system programmed to execute the method or methods described herein, and as a computer program product. According to the computer system implementation, sets of instructions for executing the method or methods are resident in the random access memory 214 of one or more computer systems configured generally as described above. Until required by the computer system, the set of instructions may be stored as a computer program product in another computer memory, for example, in disk drive 220 (which may include a removable memory such as an optical disk or floppy disk for eventual use in the disk drive 220). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change, While it is convenient to describe the invention in terms of instructions, symbols, characters, or the like, the reader should remember that all of these and similar terms should be associated with the appropriate physical elements.

Figure 3:
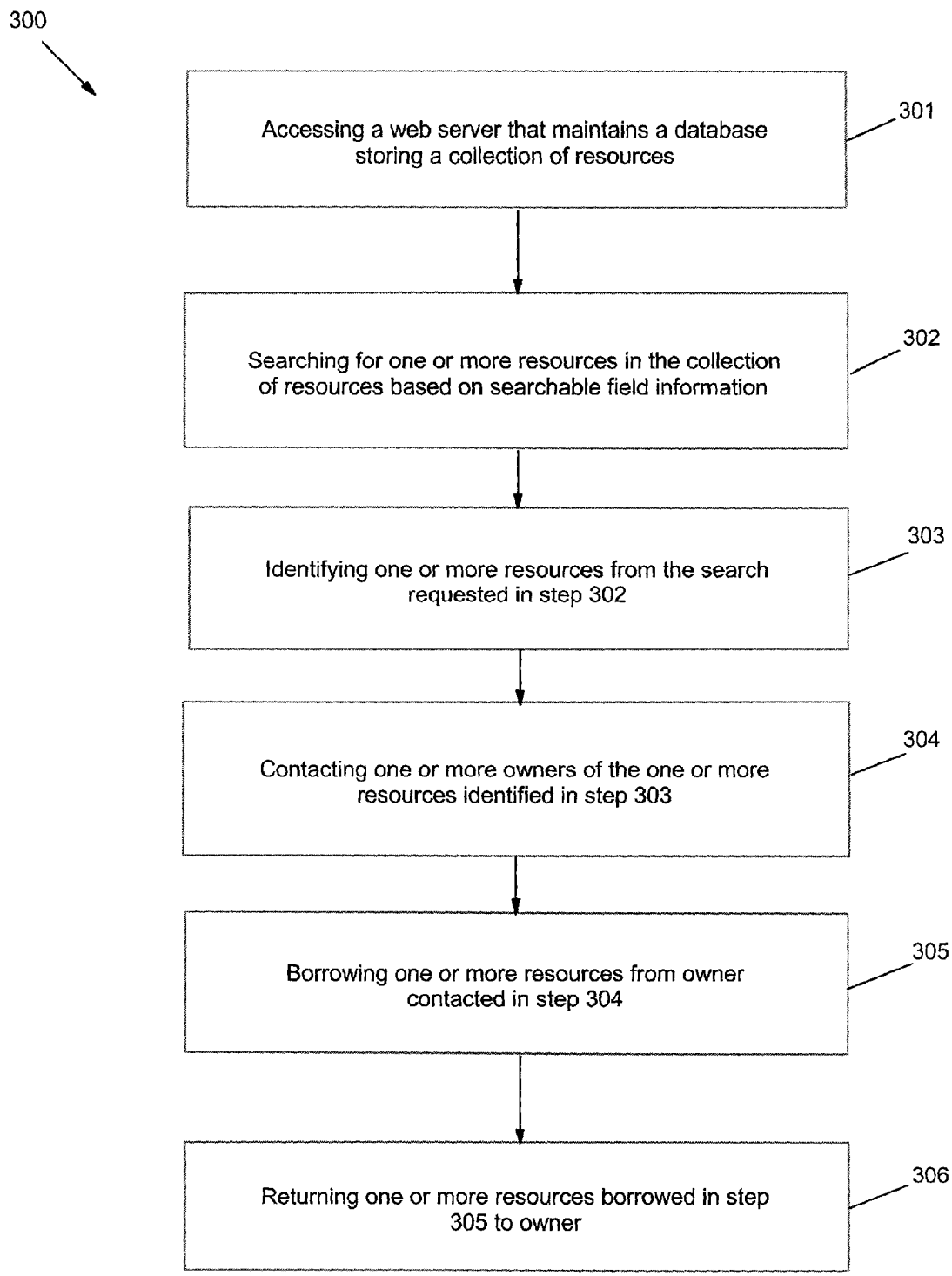
FIG. 3 is a flowchart of a method for distributing a collection of resources.

FIG. 3—Method for Distributing a Collection of Resources

FIG. 3 illustrates one embodiment of the present invention of a method 300 for distributing a collection of resources stored in database 130. As stated in the Background Information section, computer users may be able to search for particular types of materials, e.g., books, periodicals, trade publications, newspapers, over the Internet/Intranet such as in a "virtual library." A virtual library may allow users access to certain types of materials over the Internet/Intranet which an ordinary library makes available to the public. Typically, the computer user may be able to download a copy of the material, e.g., newspaper article, over the Internet/Intranet in the form of downloadable data. Unfortunately, computer users may not be able to access all types of materials in a virtual library environment. For example, computer users may not be able to borrow materials especially those in a physical (tangible) form, e.g., compact discs, equipment, video tapes, microfilm. It would therefore be desirable to develop a web based resource distribution system, e.g., virtual library system, that allows users to borrow materials in physical form. It would further be desirable to develop a web based resource distribution system, e.g., virtual library system, that maintains a listing of resources that are available for distribution across a company's facility at a single location or campus. Method 300 is a method for distributing a collection of resources, e.g., compact discs, equipment, newspapers, video tapes, microfilm, books, periodicals, trade publications, etc., where the resources may be borrowed, i.e., loaned out, in physical form to other individuals, e.g., individuals in an organization. It is noted that method 300 may be implemented to distribute a collection of resources across an organization's facility at a single location or campus. However, it is further noted that method 300 may be implemented to distribute a collection of resources in geographically diverse places.

In step 301, a user of client 120 may access web server 110 that maintains a database 130 storing profiles on a collection of resources, e.g., compact discs, equipment, video tapes, microfilm, books, periodicals, trade publications, etc., via web browser 121. Each resource registered in database 130 may comprise a profile. In one embodiment, the profile may comprise fields of information regarding the resource associated with that profile as illustrated in FIG. 4. For example, referring to FIG. 4, the resource profile may comprise one or more of the following fields of information: resource name, resource subject, resource type, resource owner, resource location, check in/out status, checkout restrictions, checkout currently allowed, checkout statistics, permitted length of checkout, author(s), black-out period, new owner need indicator, contact information, etc.

The resource name field may comprise the name of the resource, e.g., title of the book. The resource subject field may comprise the subject matter of the resource, e.g., digital design, integrated circuits. The resource owner field may comprise information as to the name of the owner, i.e., custodian, of the resource associated with the profile. The resource type field may comprise information as to the type of the resource, e.g., book, compact disc, periodical, trade publication. The resource location field may comprise information as to the location of the resource. The check in/out status field may comprise information as to whether or not the resource is available to be borrowed, i.e., loaned out. If the resource is checked out, i.e., loaned out, then the check in/out status field may comprise the expected date of return as well as the name of the person who checked out the resource. The checkout restrictions field may comprise information as to who may borrow the resource associated with that profile. For example, the resource may be restricted to be loaned to management only or to certain engineering teams. The checkout restrictions field may further comprise information as to where the resource may be taken. For example, the resource may be restricted to not leave the premises. The checkout currently allowed field may comprise information as to whether or not the resource may be checked out. In one embodiment, all the resources that satisfied the search criteria entered by the user may be listed even though not all of the resources listed may be checked out. The checkout statistics field may comprise information as to the number of checkouts of the resource during a particular period of time. The checkout statistics field may further comprise information as to the date the resource was last checked out. The permitted length of checkout field may comprise information as to the time period the resource may be checked out. The author(s) field may comprise the author, if permitted, of the resource. The black-out period field may comprise information as to when the resource may not be checked out, i.e., loaned out. In one embodiment, the black-out period may be set by the owner, i.e., custodian, of the resource. The new owner need indicator field may comprise information as to whether or not an owner of the resource desires to continue to have custodianship of the resource. In one embodiment, when the owner, i.e., custodian, of the resource may desire to not continue to have custodianship of the resource, the owner may edit the profile of the resource so that the new owner need indicator field indicates that the present owner desires to discontinue being custodian of the resource. Hence a new owner may be located thereby preventing the discarding of the resource which may be needed by other individuals within the organization. The contact information field may comprise information as to the contact information, e.g., office location, telephone number, e-mail address, so that a user may contact the owner regarding borrowing the resource. In one embodiment, the contact information field may indicate a preferred method of contacting the owner regarding borrowing the resource.

Figure 5:
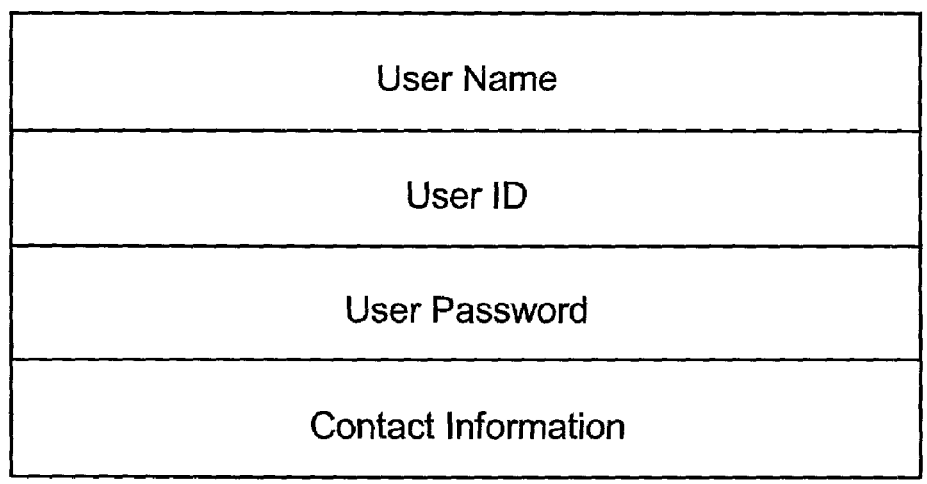
FIG. 5 illustrates an embodiment of the present invention of a user profile comprising one or more fields of information.

As stated above, a user of client 120 may access web server 110 that maintains a database 130 storing profiles on a collection of resources, e.g., compact discs, equipment, video tapes, microfilm, books, periodicals, trade publications. etc., via web browser 121 in step 301. In one embodiment, database 130 may farther store profiles on particular users that may access web server 110. The user profiles may comprise fields of information regarding the user associated with that profile as illustrated in FIG. 5. For example, referring to FIG. 5, the user profile may comprise one or more of the following fields of information: user name, user ID, user password, user contact information. The user name field may comprise the name of the user that may be permitted to access web server 110 in order to search for one or more resources in the collection of resources based on searchable field information as described below. The user ID field may comprise the login ID of the user. The user password field may comprise the password of the user. In one embodiment, the user must provide the correct user ID and user password in order to access web server 110 to search for one or more resources in the collection of resources based on searchable field information as described below. The user contact information may comprise contact information, e.g., office location, telephone number, e-mail address, that allows an owner, i.e., custodian, of a resource that was loaned to a user to contact the user regarding borrowing the resource. In one embodiment, the contact information field may indicate a preferred method of contacting the user regarding borrowing the resource.

In step 302, user of client 120 may issue a search request via web browser 121 to search for one or more resources in the collection of resources based on searchable field information. The user of client 120 may search for resources in the collection of resources whose profiles are stored in database 130 based on one or more fields of information in each profile of each resource in the collection of resources. For example, the user of client 120 may search for resources based on one or more of the following fields: resource name, e.g., title of resource, resource subject, e.g., subject matter, resource owner, resource location, author(s).

It is noted that in a prior access to web server 110, the owner, i.e., custodian, may register one or more resources to be added to the collection of resources whose profiles are stored in database 130 via web browser 121. In one embodiment the owner may input information in the fields of each profile of the one or more resources to be registered thereby allowing other individuals in an organization to access the one or more resources. It is further noted that the owner, i.e., custodian, of one or more resources may edit any field in each profile of any resource registered under the owner. For example, the owner, i.e., custodian may transfer ownership, i.e. custodianship, to a new owner. The owner, i.e., custodian, may temporarily suspend borrowing, i.e., loaning of the resource, by modifying the black-out period field in the profile of that resource. The owner, i.e., custodian, may incorporate or modify loan restrictions by inserting or modifying restrictions in the checkout restrictions field in the profile of that resource. The owner, i.e., custodian, may further modify information about the resource, e.g., resource subject.

In step 303, one or more resources in the collection of resources stored in database 130 may be identified from the search request in step 302.

In step 304, the user of client 120 may contact one or more owners, i.e., custodians, of the one or more resources identified in step 303 by reviewing the contact information field in each profile of the one or more resources identified in step 303. The user of client 120 may contact the one or more owners of the one or more resources identified in step 303 by any means of contacting an individual, e.g., telephone, e-mail, walk to the owner's office. It should be noted that the contact information field in the profile may comprise information as to the specific method of contacting the owner with regard to borrowing the resource.

In step 305, one or more resources may be borrowed, i.e., loaned out, from an owner contacted in step 304 to the user of client 120. When a resource has been loaned out, the check in/out status field may then be edited to indicate that the resource has been checked out, i.e., loaned out. In one embodiment, the check in/out status field may indicate that a resource has been checked out upon approval of both the borrower and owner, i.e., custodian, of the resource. For example, the borrower and owner may each have to enter a code to modify the check in/out status field to indicate that the resource has been checked out.

In step 306, the user of client 120 that borrowed one or more resources in step 305 may return the one or more resources borrowed to the owner contacted in step 304. As stated above, the permitted length of checkout field in the profile of each resource borrowed indicates the permitted length of borrowing the resource. If the borrower does not return the resource within the permitted length of borrowing the resource, a penalty may be implemented. For example, the borrower may no longer be able to borrow any of the resources in the collection of resources whose profiles are stored in database 130. The borrower may be assessed a fine for each day the borrower keeps the resource beyond the permitted length of borrowing the resource. When a resource has been returned, the check in/out status field may then be edited to indicate that the resource has been checked in, i.e., returned. In one embodiment, the check in/out status field may indicate that a resource has been checked in upon approval of both the borrower and owner, i.e., custodian, of the resource. For example, the borrower and owner may each have to enter a code to modify the check in/out status field to indicate that the resource has been checked in, i.e., returned. In one embodiment, if the resource has not been returned, i.e., the check in/out status field has not be edited to indicate that the resource has been checked in, then the borrower may automatically be prevented from searching for resources in the collection of resources whose profiles are stored in database 130 and subsequently prevented from borrowing any new resources until the resource has been returned, i.e., the check in/out status field has been edited to indicate that the resource has been checked in.

Although the system and method are described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims. It is noted that the headings are used only for organizational purposes and not meant to limit the scope of the description or claims.

The invention claimed is:

1. A method for distributing a collection of resources comprising the steps of:
   accessing a web server maintaining a database of profiles associated with said collection of resources;
   identifying a resource in said collection of resources;
   contacting an owner of said resource; and
   borrowing said resource from said owner, wherein said owner is an individual person;
   wherein each resource in said collection of resources has a profile associated with it;
   wherein said profile comprises fields of information;
   wherein said fields of information comprise one or more of the following: resource name, resource type, resource subject, author(s), resource owner, resource location, checkout restrictions, check in/out status, permitted length of checkout, black-out period, new owner indicator, contact information; and
   wherein said new owner indicator field indicates whether or not an owner of a particular resource desires to continue to have custodianship of said particular resource.

2. A method for distributing a collection of resources comprising the steps of:
   accessing a web server maintaining a database of profiles associated with said collection of resources;
   identifying a resource in said collection of resources;
   contacting an owner of said resource; and
   borrowing said resource from said owner, wherein said owner is an individual person, wherein each resource in said collection of resources has a profile associated with it, wherein said profile comprises fields of information, wherein said fields of information comprise one or more of the following: resource name, resource type, resource subject, author(s), resource owner, resource location, checkout restrictions, check in/out status, permitted length of checkout, black-out period, and new owner indicator, contact information, wherein said black-out period field indicates when a particular resource is not to be checked out.

3. A method for distributing a collection of resources comprising the steps of:
   accessing a web server maintaining a database of profiles associated with said collection of resources;
   identifying a resource in said collection of resources;
   contacting an owner of said resource; and
   borrowing said resource from said owner, wherein said owner is an individual person, wherein each resource in said collection of resources has a profile associated with it, wherein said profile comprises fields of information, wherein said fields of information comprise one or more of the following: resource name, resource type, resource subject, author(s), resource owner, resource location, checkout restrictions, check in/out status, permitted length of checkout, black-out period, and new owner indicator, contact information, wherein said black-out period field indicates a time period a particular resource is to be checked out.

4. A system comprising:
   a client coupled to a web server configured to provide access to a database of profiles associated with a collection of resources, wherein said client comprises a web browser, wherein a user of said client performs the following steps:
     searching for one or more resources in said collection of resources via said web browser;
     identifying a resource in said collection of resources;
     contacting an owner of said resource; and
     borrowing said resource from said owner, wherein said owner is an individual person;
   wherein each resource in said collection of resources has a profile associated with it;
   wherein said profile comprises fields of information;

wherein said fields of information comprise one or more of the following: resource name, resource type, resource subject, author(s), resource owner, resource location, checkout restrictions, check in/out status, permitted length of checkout, black-out period, new owner indicator, contact information; and wherein said new owner indicator field indicates whether or not an owner of a particular resource desires to continue to have custodianship of said particular resource.

5. A system comprising:

a client coupled to a web server configured to provide access to a database of profiles associated with a collection of resources, wherein said client comprises a web browser, wherein a user of said client performs the following steps:

searching for one or more resources in said collection of resources via said web browser;

identifying a resource in said collection of resources;

contacting an owner of said resource; and borrowing said resource from said owner, wherein said owner is an individual person, wherein each resource in said collection of resources has a profile associated with it, wherein said profile comprises fields of information, wherein said fields of information comprise one or more of the following: resource name, resource type, resource subject, author(s), resource owner, resource location, checkout restrictions, check in/out status, permitted length of checkout, black-out period, and new owner indicator, contact information, wherein said black-out period field indicates when a particular resource is not to be checked out.

6. A system comprising:

a client coupled to a web server configured to provide access to a database of profiles associated with a collection of resources, wherein said client comprises a web browser, wherein a user of said client performs the following steps:

searching for one or more resources in said collection of resources via said web browser;

identifying a resource in said collection of resources;

contacting an owner of said resource; and borrowing said resource from said owner, wherein said owner is an individual person, wherein each resource in said collection of resources has a profile associated with it, wherein said profile comprises fields of information, wherein said fields of information comprise one or more of the following: resource name, resource type, resource subject, author(s), resource owner, resource location, checkout restrictions, check in/out status, permitted length of checkout, black-out period, and new owner indicator, contact information, wherein said black-out period field indicates a time period a particular resource is to be checked out.

* * * * *